United States Patent [19]

Bell

[11] Patent Number: 4,987,561

[45] Date of Patent: Jan. 22, 1991

[54] SEISMIC IMAGING OF STEEPLY DIPPING GEOLOGIC INTERFACES

[75] Inventor: David W. Bell, Ponca City, Okla.

[73] Assignee: Conoco Inc., Ponca City, Okla.

[21] Appl. No.: 532,156

[22] Filed: Jun. 1, 1990

Related U.S. Application Data

[63] Continuation of Ser. No. 287,951, Dec. 19, 1988, abandoned.

[51] Int. Cl.[5] .......................... G01V 1/00; G01V 1/28
[52] U.S. Cl. ........................................ 367/53; 367/37; 367/59; 367/61
[58] Field of Search ..................... 367/37, 53, 59, 61, 367/52, 56, 57; 364/421

[56] References Cited

U.S. PATENT DOCUMENTS

| | | | |
|---|---|---|---|
| 2,431,600 | 11/1947 | Wolf | 367/37 |
| 2,449,921 | 9/1948 | Wolf | 367/56 |
| 3,668,620 | 6/1972 | Mathieu et al. | 367/53 |
| 3,696,331 | 10/1972 | Guinzy et al. | 367/53 |
| 4,346,462 | 8/1982 | du Boullay | 367/61 |
| 4,509,149 | 4/1985 | Ruehle | 367/27 |
| 4,706,223 | 11/1987 | Zimmerman | 367/53 |

Primary Examiner—Ian J. Lobo

[57] ABSTRACT

A method for determining the location of steeply dipping subsurfaces includes acquiring seismic reflection data, identifying select data which has characteristics indicating that the acoustic pulses which it represents have been reflected from a substantially horizontal interface and a steeply dipping interface, analyzing the select data to locate the steeply dipping interface and displaying the analyzed data.

12 Claims, 5 Drawing Sheets

SEISMIC IMAGING OF STEEPLY DIPPING GEOLOGIC INTERFACES

PRIOR RELATED APPLICATIONS

This application is a continuation of Ser. No. 07/287,951 filed Dec. 19, 1988 now abandoned.

BACKGROUND OF THE INVENTION

1. Field of the Invention

The present invention pertains to seismic data processing and more particularly to processing data representing acoustic seismic (visco-elastic) waves reflected from both a substantially horizontal interface and a steeply dipping interface.

2. Related Prior Art

In acquiring seismic data, a seismic source is used to generate visco-elastic seismic acoustic waves that are directed into the earth's surface. At changes in the impedance of subsurface material, commonly called interfaces, the waves are partially reflected back in the direction of the seismic source at an angle governed by the law of reflection. The reflected portions of the waves are detected by seismic receivers. These receivers produce an electrical signal representing the reflected wave which may then be digitized and recorded. Further processing uses the recorded electrical signals to calculate the travel time of the wave, approximate the average velocity of the wave and determine the depth of the subsurface interface. In general, it is assumed that the recorded electrical signals represent (seismic) acoustic waves which have been reflected once.

In general, prior art methods are incapable of determining the location of steeply dipping interfaces through surface generation of acoustic or seismic pulses. Prior art methods for approximating steeply dipping interfaces require subsurface seismic pulse generation, using single bounce characteristics in data processing.

For example, U.S. Pat. No. 4,509,149 titled "Directional Long Array for Logging Vertical Boundaries" (Ruehle) deals with an apparatus used to plot typical interfaces. A logging sonde has directional control of multiple sources and receivers in linear arrays. Each of the sources produces acoustic pulses which are delayed by a time delay between the sources to direct acoustic energy at an angle such that the resulting acoustic wave strikes a vertical formation or interface. Reflections of the acoustic pulses are detected with a linear array of receivers. The acoustic pulse directed by each receiver is delayed by an amount such that the total differential moveout for a reflected directional wave is zero.

This patent is similar to the present invention in so far as it is used to determine the location of nearly vertical interfaces. However, Ruehle uses data obtained from a downhole logging tool having subsurface acoustic pulse sources and receivers in defining the shape of a subsurface vertical formation. Further, Ruehle uses single bounce characteristics in data processing to identify the location of the vertical or nearly vertical interface.

U.S. Pat. No. 4,346,462 "Seismic Prospecting Method Providing for the Determination of the Flank Dip of Subterranean Layers and Device for Carrying Out the Same" (du Boullay) uses a surface pulse generator to transmit acoustic waves with different directivity diagrams toward a subsurface interface. This patent describes a method for determining the flank dip of subterranean layers with respect to the plane of a seismic profile. Acoustic waves with different directivity diagrams are sequentially transmitted towards subsurface interfaces. These corresponding reflected waves are recorded. Transmitted acoustic intensities are combined according to predetermined criteria. Values which are representative of the intensity of the reflected waves are combined separately in each of the directivity diagrams. The results of the separate combinations are then compared.

Du Boullav provides a method for determining the flank dip of subterranean layers with respect to the plane of a seismic profile by using a single bounce characteristic in determining the position of the flank dip. While the method described can identify dipping formations, it requires specially generated acoustic pulses and uses pulses that have been reflected only once.

U.S. Pat. No. 3,696,331 titled "Automated Process for Determining Subsurface Velocity from Seismograms" (Guinzy et al.) deals with a method for determining the velocity of acoustic pulses in a subsurface formation from a suite of seismograms. The signal power of windows from the seismograms is detected for different assumed values of velocity, vertical travel time and dip. A function indicative of signal presence is plotted as a function of velocity for different vertical travel times to provide an indication of the acoustic velocity characteristic. The plot of signal power for different dip searches provides seismograms from an area including dipping formations.

The Guinzy et al. patent provides a method for determining the velocity of subsurface acoustic pulses for a suite of seismograms. In determining the velocity, different values of dip are assumed for a dip search. A plot of signal power for different dip searches is used to provide seismograms for an area which includes dipping formations. As with the previous two patents, the Guinzy et al. patent also relies on single bounce characteristics.

U.S. Pat. No. 3,668,620 titled "Method and Apparatus for Determination of Seismic Signal Event Coherence" (Mathieu et al.) relates to a method and apparatus for processing multi-trace seismic signals to determine the most coherent dip attitude for any selected point in time. Similar event signals from a plurality of seismic traces at selected time delays per trace in predetermined time increments along the multi-trace seismic signals are accentuated. Each of the plural traces of selected time delays per trace are combined to derive a plurality of signals, each indicative of a selected step-out or dip angle. The plurality of signals are combined to produce an output signal indicative of the most coherent dip attitude.

While this method is particularly appropriate for subsurface formations having slight to moderate dip, this method along with all of the foregoing methods using surface sources, is incapable of dealing with steeply dipping formations. None of the methods make use of seismic energy which reflects from both a nearly horizontal interface and a nearly vertical interface.

SUMMARY OF THE INVENTION

In prior methods for determining the dip of subsurface formations, using surface seismic sources and receivers, a slight to moderate dip is assumed and each reflected seismic wave is assumed to have been reflected only once. The present invention provides a method and apparatus for determining the position of steeply dipping interfaces which occur at an angle such that seismic waves are reflected twice before being detected by a seismic receiver. The receiver converts the seismic energy into electrical signals. The signals are separated into single and double reflection events on the basis of travel time moveout. A subsurface velocity is determined in the conventional manner. The vertical two way travel time for the horizontal interface is corrected to a vertical two way travel time for a vertical interface. This is done by assuming a location for the steeply dipping interface and applying the seismic velocity to a calculated source receiver offset that differs from the actual offset used in conventional processing. The electrical signals representing various traces are summed for the approximated locations, their total equaling a maximum at the correct location.

DESCRIPTION OF THE PREFERRED EMBODIMENT

This invention locates steeply dipping geologic interfaces by utilizing seismic energy which is initiated near the earth's surface, reflected first from a nearly horizontal interface and second from a nearly vertical interface, or vice-versa, and is then recorded near the earth's surface. Although the collection of the data is performed in a manner similar to other seismic techniques, the present invention identifies and uses a portion of the total reflection energy that is discarded in conventional analysis.

Data from a multiplicity of source-receiver pairs is recorded. Those pairs with nearly the same reflection locations on the vertical interface are corrected to vertical two-way travel time based on an assumed interface location. The data is then summed. The process is repeated for a number of possible interface locations. The correct location will yield the largest sum and is associated with the proper surface position and two-way travel time.

The present invention is useful for locating the flanks of salt domes. In particular, it works for steeply dipping interfaces, including slight overhangs, which are not imaged by conventional techniques.

The present invention consists basically of four steps. First, seismic reflection data is acquired in the form of electrical signals. Second, the data is analyzed to identify and separate data having predetermined characteristics. Third, the selected data is further analyzed to locate the steeply dipping interface. Fourth, the location of the interface is displayed.

Figure 1:
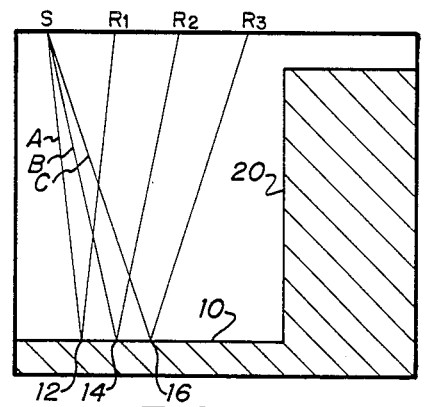
FIG. 1 is a graphical representation of conventional raypaths used to locate horizontal interfaces.

In the first step, data acquisition, the desired data is collected simultaneously with the data used in conventional seismic analysis. There is no requirement for specially generated acoustic or seismic pulses or equipment other than that which is normally used. These acoustic or seismic waves may be generated as is done normally. FIG. 1 illustrates the single-reflection ray paths used in standard seismic processing. Seismic pulses A, B and C are generated by source S, reflected by horizontal interface 10 at points 12, 14 and 16 and detected by receivers $R_1$, $R_2$, and $R_3$ respectively.

Figure 2:
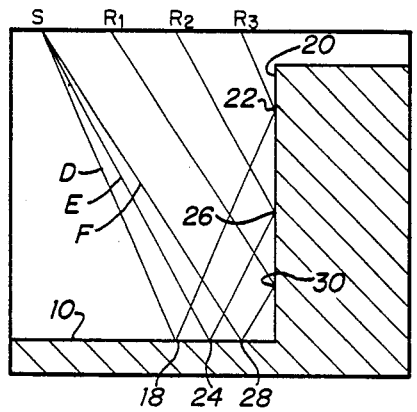
FIG. 2 is a graphical representation of double bounce raypaths used to locate nearly vertical interfaces.

Referring now to FIG. 2, double bounce raypaths are illustrated for seismic pulses D, E and F. Pulse D is reflected at point 18 by horizontal interface 10, is reflected again by vertical interface 20 at point 22 and detected by receiver $R_3$. Pulse E is reflected by horizontal interface 10 at point 24, is reflected again by vertical interface 20 at point 26 and detected by receiver $R_2$. Pulse F is reflected by horizontal interface 10 at point 28, is reflected by vertical interface 20 at point 30 and is detected by receiver $R_1$.

Notice that no single-reflection ray path from a vertical interface can be recorded from the surface. It is also to be noted that for double bounce raypaths, the arrival time is greater as the receiver is closest to the source, opposite that of normal moveout.

Receiver locations near the source increase the amount of double-reflection energy that can be recovered. In particular, the near offsets are useful for imaging deeper structure, as seen in FIG. 2 and also in FIG. 5. Conventional acquisition sometimes employs a large gap.

In step 2, identification and separation of signals having predetermined characteristics, two situations may arise. If the receivers are between the source and the steeply dipping interface, then the desired events seen on the display of a shot profile (receiver offset versus recording time) will have arrival times which increase with decreasing offset. This is opposite to the moveout of single reflection events (see FIG. 3). Various filtering techniques can separate events with opposite moveouts. If the source is between the receivers and the steeply dipping interface, then the data from several shots can be collected into common receiver profiles which will display opposite moveout between the single reflection and double reflection paths. The double bounce events will be flat on common midpoint trace gathers if the interfaces are truly horizontal and vertical.

Figure 4:
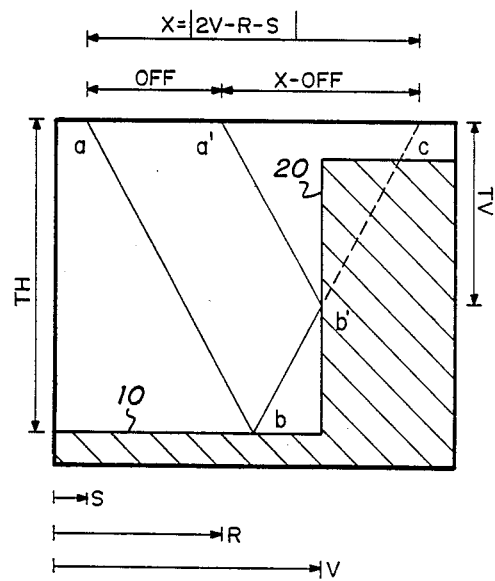
FIG. 4 is a graphical representation of FIG. 2 with travel time indicated.

The third step of the present invention, further analysis of the selected data, includes several aspects. Several steps are needed to convert the signal from the double-reflection ray paths into an image of the steeply dipping surface. One technique is based on the observation that the travel time of a ray bouncing successively from both sides of a right angle structure is identical to the travel time of a ray with a different source-receiver offset that reflects only from the horizontal interface. FIG. 4 illustrates the offset versus travel time for single and double bounce acoustic or seismic pulses. The two paths have identical legs from point a to point b and from point b to point b'. If interface 10 is truly horizontal and interface 20 is truly vertical, i.e. they form a ninety degree right angle, the travel path from point b' to point a' will equal the path from point b' to point c.

This observation allows the travel time to the horizontal interface to be obtained from the stacking velocities determined in routine processing of the seismic data. That is, the actual source-receiver spacing of the recorded data is changed to the offset of an equivalent travel time single bounce ray. This is equivalent to folding the double reflection events on a shot profile about their intersection with the single reflection events as illustrated in FIG. 4. Conventional normal moveout is then applied using normal stacking velocities.

FIG. 4 illustrates that the source-receiver offset of the identical travel time ray can be calculated if the location of the vertical interface is assumed. For example, if R = the distance of the receiver from an arbitrary origin, S = the distance of the source from the same origin, V = the distance of the vertical interface from the origin, OFF = the actual source-receiver offset, then the new offset X is given by $$X = OFF + 2|V-R| = |2V-R-S|$$

Figure 3:
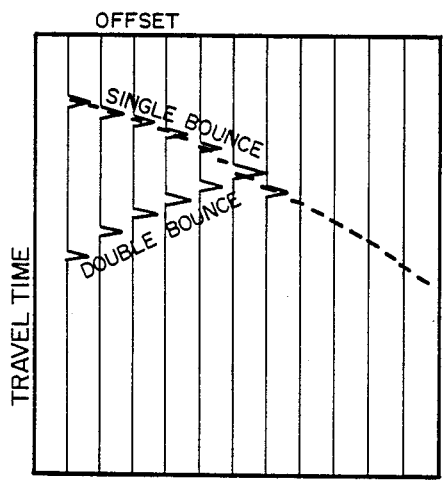
FIG. 3 is a graphical representation of a shot profile of offset versus travel time.

After the offset distance is mathematically modified and the normal moveout correction is applied, the next step is to convert the time scale from the vertical two-way time to the horizontal interface (TH) into the vertical two-way time to the vertical interface (TV). Using the similar triangles (triangle abc) and (triangle a'b'c) in FIG. 3 gives $$TV = \frac{(X - OFF)}{X} TH$$

Figure 5:
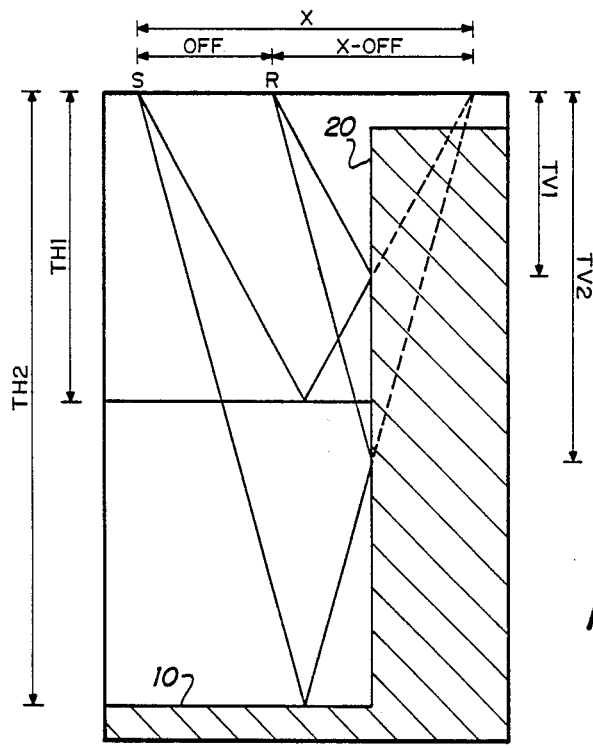
FIG. 5 is a graphical representation illustrating an extension of the representation of FIG. 4.

The time correction factor $$TC = \frac{TV}{TH} = \frac{(X - OFF)}{X}$$

is valid within the approximation of normal moveout for double bounces from any number of horizontal layers. As illustrated in FIG. 5, $$TC = \frac{TV1}{TH1} = \frac{TV2}{TH2}$$

FIG. 2 shows that single shot and multiple receivers give different reflection points on the vertical interface. If additional shots are added, then a multiplicity of events with the same reflection points can arise. All source-receiver pairs with the same TC and reflected from the same horizontal layer will have approximately the same reflection points on the vertical interface. The position of reflection points on the vertical interface varies with TC and depends on the number and location of the horizontal interfaces as well as the source and receiver positions. A uniform spacing of shots and receivers on the surface will not give uniformly spaced reflection points on the vertical interface. The maximum number of rays with the same TC will be equal to the number of shots under consideration.

Next, all traces with TC's within narrow ranges are summed. If the correct location of the vertical interface 20 was used in the analysis, the individual traces will add constructively. If an incorrect location of vertical interface 20 was chosen, destructive interference will occur and the sum of the traces will be less.

Figure 6:
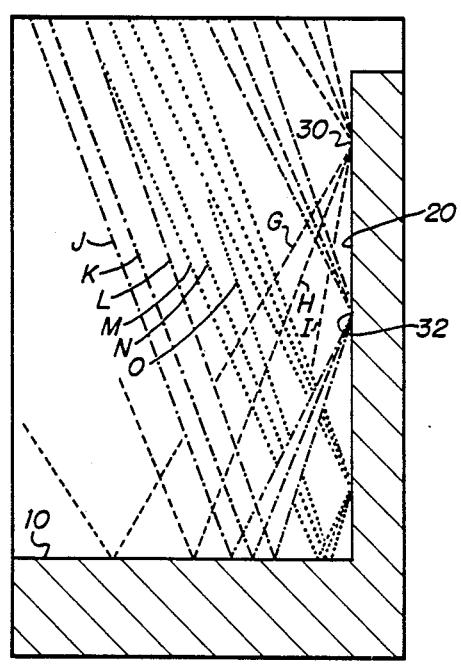
FIG. 6 is a representation of traces gathered by common reflection point on a vertical interface.

FIG. 6 illustrates common reflection points on vertical interface 20. Raypaths having the same reflection points on vertical interface 20 are corrected to the proper two way travel time and summed. For example, raypaths G, H and I have the same reflection point 32 on vertical interface 20, raypaths J, K and L have the same reflection point 34 and raypaths M, N and O have the same reflection point 36.

Figure 7:
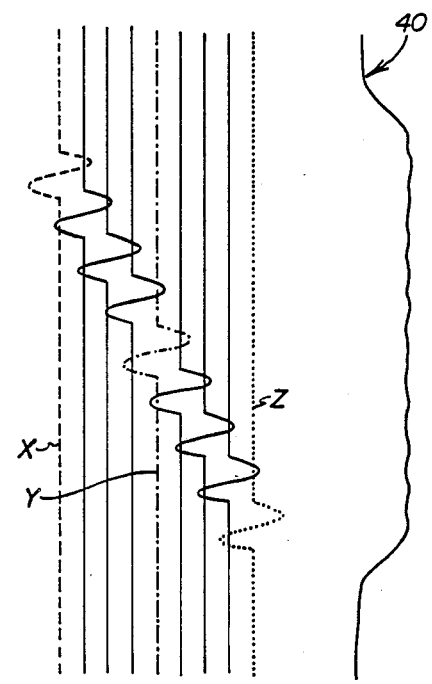
FIG. 7 is an illustration of summed common traces.

Since all traces for a given location are assumed to define a single vertical interface 20, the traces formed by summing over TC can be further combined into a single trace representative of the assumed location of the vertical interface. The absolute values of these traces are then added to form a single trace representing the basement location. In FIG. 7, trace X represents the sum of raypaths G, H and I, while traces Y and Z represent the sums of raypaths J, K and L and raypaths M, N and O, respectively. Trace 40 is the sum of the absolute values of these traces. The absolute values of the traces are taken before the final sum since the wavelets from closely spaced reflection points can destructively interfere.

The position of the vertical interface is determined by scanning several possible locations. That is, all shot profiles that can make a reasonable contribution of double bounce events are combined for an assumed location. Then the assumed location is moved and all calculations performed again. The output traces will increase in amplitude when the true position is approached. The location of the interface is outlined by the largest amplitudes appearing in the set of summed traces.

In step 4, the display or identification of the location of vertical interface 20 may be done in many forms. The above scan of possible locations of the vertical interface yields a series of traces in two-way travel time to the vertical interface. These traces may be either color coded or contoured in amplitude and superimposed on a normal stacked seismic section. The maximum amplitudes are used to define the location of the vertical interface 20. An example illustrating how the location of the vertical interface is defined is shown in FIG. 10.

Figure 10:
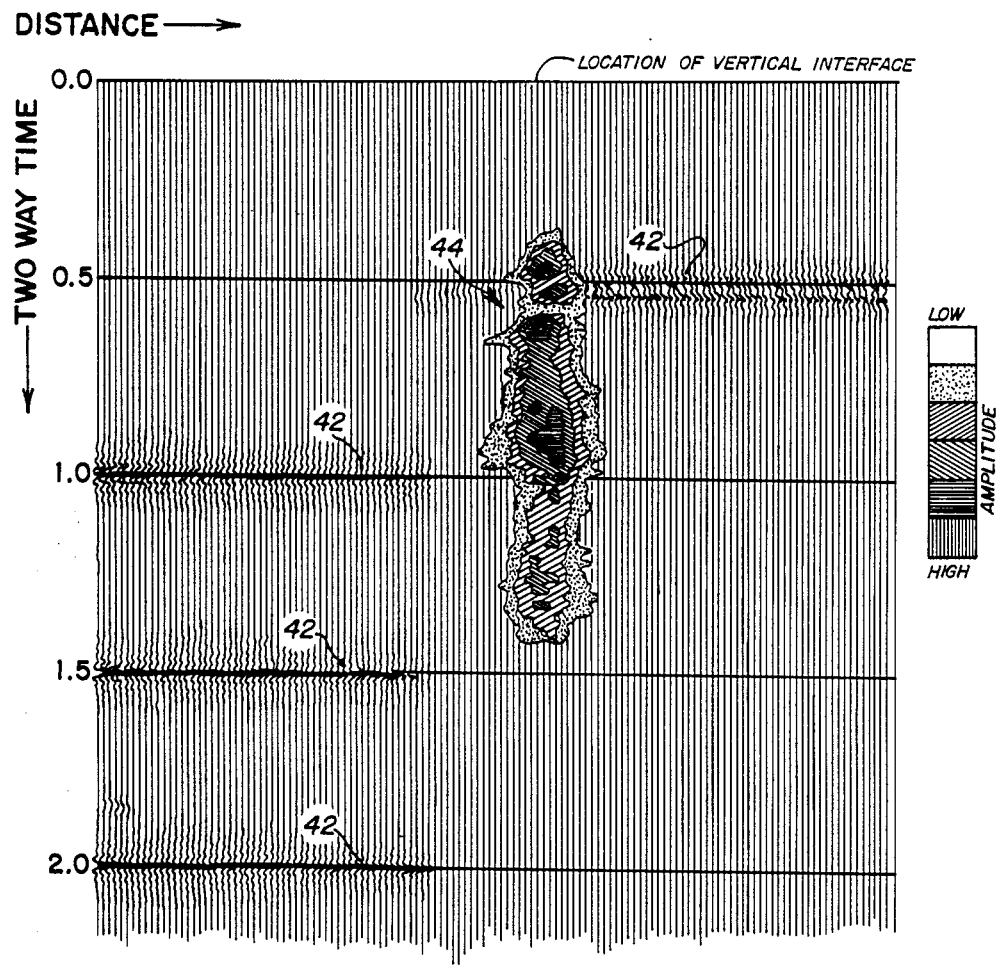
FIG. 10 is a seismogram of an image from synthetic data representing an idealized model of a salt dome.

FIG. 10 shows the application of the technique to an idealized model of a salt dome. The background traces 42 are from conventional processing of seismic data. The conventional traces clearly show the horizontal interfaces, but do not directly reveal the location of the vertical interface. The horizontal layers stop short of the actual location of the vertical flank because of the gap between the source and the nearest offset that was used to simulate normal recording parameters. The contoured amplitudes 44 obtained from summing the double bounce reflections for all basement locations show the location of the vertical interface. The image fades with increasing time due to decreasing fold of stack brought about in part by the gap in the near offsets.

The model used to generate the traces input into the analysis for FIG. 10 consisted of four horizontal layers and a nearly vertical salt layer. The data is idealized by setting all reflection amplitudes equal to one. For real data, the aperture of useful data will depend on several aspects, one of which is the relative signal to noise ratio. The aperture of useful data also depends on variations of polarity seen when the reflection angle on the vertical interface becomes subcritical. The model was also simplified by using a single velocity for all the horizontal layers. This corresponds to reflections arising only from density contrasts.

Figure 8:
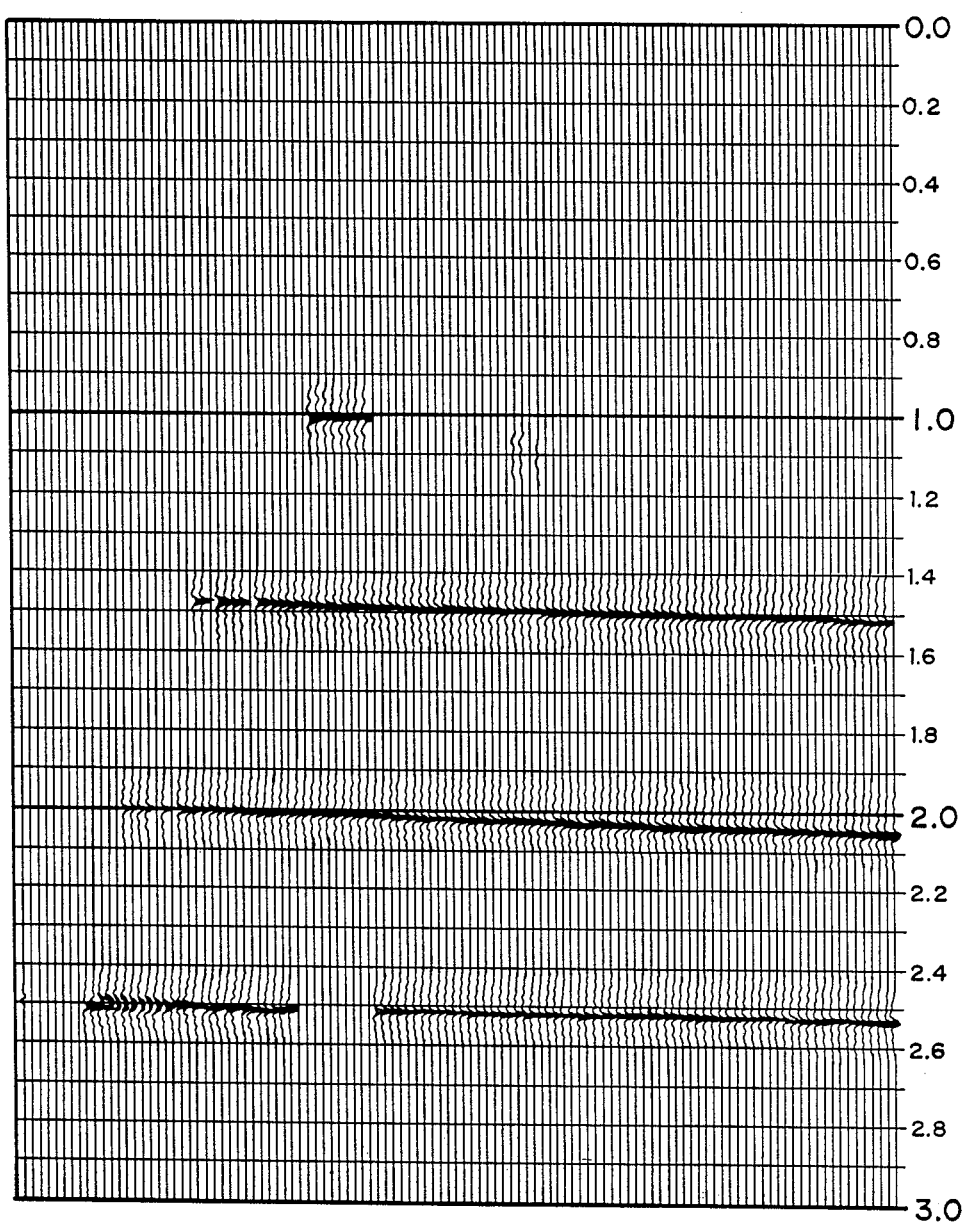
FIGS. 8 and 9 are seismograms of time corrected shot profiles from the model data.
Figure 9:
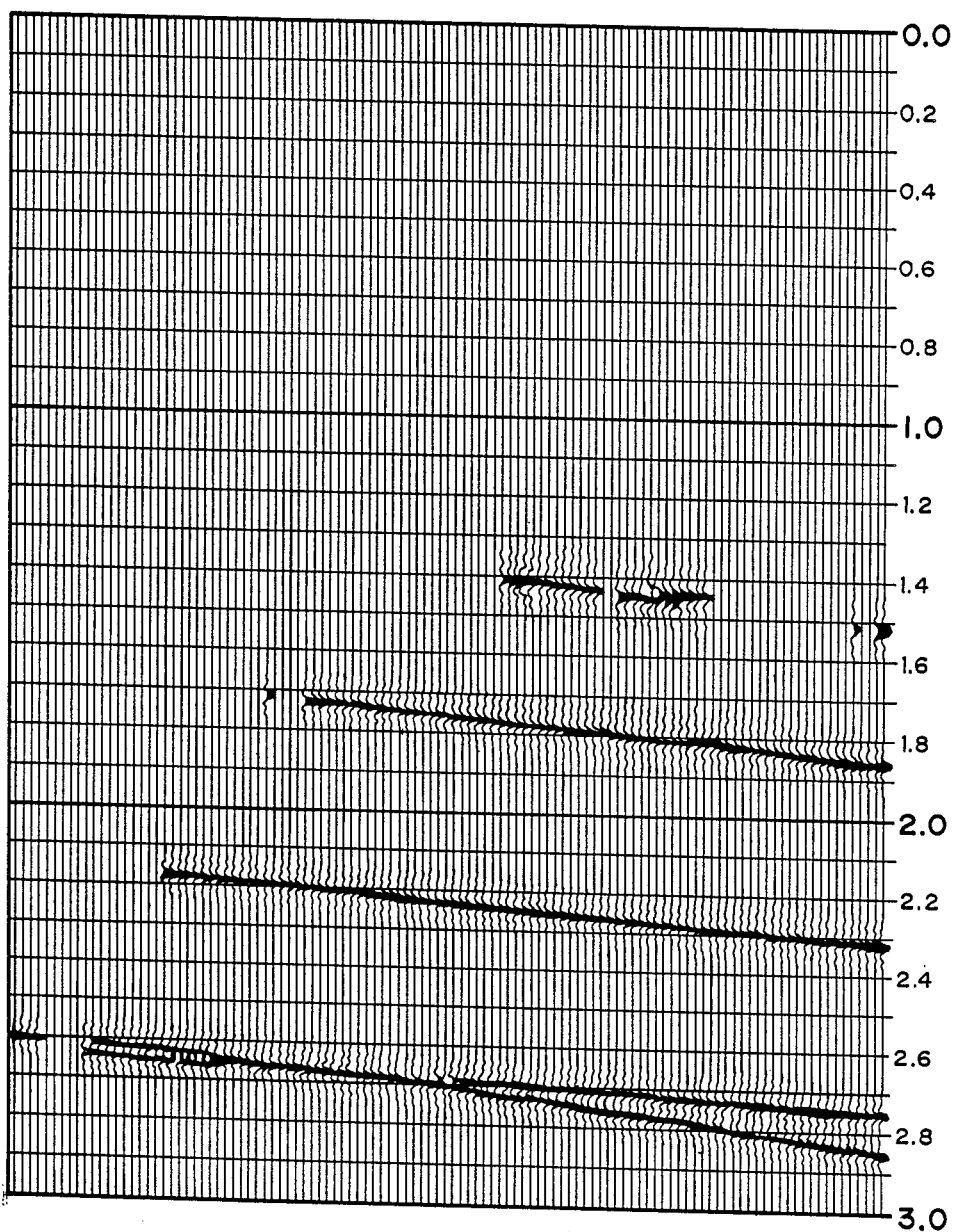

FIG. 8 and 9 illustrate the nearest shot profiles to two assumed locations of the vertical interface. FIG. 8 is the correct position. FIG. 9 is one thousand feet short of the interface. Only the double bounce events are shown, aside from some artifacts and gaps due to the modeling process. The offset has been modified according to the equation set forth above for determining a new offset and normal moveout has been applied. The events are flattened when the correct position of the vertical interface is assumed as illustrated in FIG. 8. They dip considerably when the incorrect location is used as illustrated in FIG. 9. The slight dip remaining in FIG. 8 for the correct position is due to the slight tilt of the vertical interface. For large tilts, a dip correction is appropriate.

In addition, when the position of the vertical or nearly vertical interface, such as that of a salt dome, is positioned incorrectly, the compactness of the waveform display may be affected. The traces that identify the correct position of a salt dome have compact waveforms indicating that the traces which went into the sum were properly aligned. The waveforms for traces used to identify an incorrect position would be distorted because the input traces were not correctly positioned. The largest amplitude of correctly positioned traces may be more than twice as great as the largest amplitude of incorrectly positioned traces.

In summary, the present invention consists of several steps in which seismic data that was previously discarded is used to image a nearly vertical or steeply dipping subsurface formation. Conventional seismic data obtained from a plurality of sources and receivers is recorded. Conventional processing is performed for pre-stacked velocity analysis and post-stack image display. The recorded data is sorted to identify double bounce events. Shot profiles are used if receivers are between the source and the steeply dipping interface. Receiver profiles are used if the source is between the receivers and steeply dipping interface. The data is filtered to isolated double bounce events on the basis of opposing moveout. From the post-stack image display, a maximum likely basement range of the steeply dipping interface is determined. The actual offset of each trace is transformed to the calculated offset of an equivalent single bounce raypath based on an assumed location of the steeply dipping interface. This location is also used to limit the number of traces which need to be considered.

From the pre-stack velocity analysis, a normal moveout correction is performed using the velocities thus obtained along with the calculated offsets transformed from the actual offsets. This gives a vertical two-way travel time to the horizontal reflector. A time correction factor is calculated and applied to convert the two-way travel time to the horizontal reflector into a two-way travel time to the steeply dipping reflector. The traces having nearly the same time correction factor are summed. In this manner, traces having common reflection points on the steeply dipping interface are summed. The absolute values of the traces obtained in this manner are summed. This will give a single trace for the assumed location of the steeply dipping interface. These steps are performed for additional assumed locations on the steeply dipping interface. All of these traces are displayed as variable amplitude on a plot of basement location vs time. The maximum amplitude defines the location of the steeply dipping interface.

Although the present invention has been described by way of preferred embodiment, it is to be understood that this is done by way of illustration only and the present invention is not to be limited thereto but only by the scope of the following claims.

What I claim is:

1. A method for identifying the location of a steeply dipping subsurface interface comprising the steps of:
   recording electrical signals representing seismic pulses having a two way travel time that have been generated by an acoustic source and detected by seismic receivers, said receivers having various offsets from said seismic source;
   determining a subsurface seismic velocity of said seismic pulses reflected only once from near horizontal interfaces;
   selecting electrical signals having predetermined characteristics of a travel path involving reflections from both a nearly horizontal and a nearly vertical interface;
   modifying said two way travel time of said seismic pulses into a vertical two-way time to the reflection point on the vertical interface based on said seismic velocity and an assumed location of the vertical interface;
   maximizing a sum of said modified seismic pulses by varying the assumed location of the vertical interface; and
   displaying said location of the steeply dipping interface determined by maximizing said sum.

2. The method according to claim 1 wherein said step of selecting electrical signals includes the steps of:
   comparing arrival times of said seismic acoustic pulses at each of said various offsets; and
   separating said electrical signals representing seismic acoustic pulses having moveouts characteristic of the double bounce ray paths.

3. The method according to claim 1 wherein said step of modifying said two way travel time includes the steps of:
   determining a two way travel time correction factor; and
   using said correction factor to convert the time scale from said two way travel time for said horizontal interface to a two way travel time for said steeply dipping interface.

4. The method according to claim 3 wherein said step of using said correction factor includes the steps of:
   multiplying said two way travel time for said horizontal interface by $$\frac{X - OFF}{X}$$

where
OFF = an actual offset from said various offsets,
X = said calculated new offset corresponding to said actual offset.

5. The method according to claim 3 wherein said step of maximizing the sum of said electrical signals includes the step of:
   segregating said selected electrical signals representing seismic acoustic pulses having substantially similar correction factors.

6. The method according to claim 3 further including the step of:
   combining said selected electrical signals representing seismic acoustic pulses having the same correction factor into a single electrical signal representing a single processed trace.

7. A method for determining the location of steeply dipping subsurface interfaces comprising the steps of:
   recording electrical signals representing seismic waves reflected from subsurface interfaces;

identifying selected recorded electrical signals representing seismic waves having reflected from a substantially horizontal interface and a steeply dipping interface;

separating said selected signals;

obtaining a subsurface acoustic velocity;

approximating the location of said steeply dipping interface;

changing the source-receiver offset for said selected signals to a single-bounce offset equivalent using said subsurface seismic velocity and said approximated location;

modifying the recorded two-way travel time into the two-way travel time to the vertical interface;

summing said selected signals for predetermined points on said steeply dipping interface to obtain summed trace; and displaying a location of said steeply dipping subsurface interface represented by said maximum sum.

8. The method according to claim 7 wherein said receiving step, said identifying step, said separating step, said obtaining step, said approximating step, said changing step, said modifying step and said summing step are repeated for additional assumed locations of the steeply dipping interface to obtain said maximum sum.

9. The method according to claim 7 including determining a time correction factor which includes the steps of:

obtaining the actual offset for each of said predetermined electrical signals; and calculating said time correction factor for each of said predetermined electrical signals according to the formula:

$$\text{time correction factor} = \frac{X - \text{OFF}}{X}$$

where

X = said calculated source-receiver offset,

OFF = said actual offset.

10. The method according to claim 7 further including the step of:

combining said selected electrical signals having identical time correction factors into a single electrical signal representing a single trace of a seismic pulse.

11. A method for determining the location of steeply dipping subsurface interfaces comprising the steps of:

receiving electrical signals representing seismic waves reflected from subsurface interfaces;

identifying selected electrical signals representing seismic waves having reflected from a substantially horizontal interface and a steeply dipping interface;

separating said selected electrical signals by comparing arrival times of said seismic acoustic pulses at each of said various offsets and separating said electrical signals representing seismic acoustic pulses having horizontal and vertical interface reflections;

obtaining a subsurface acoustic velocity;

approximating locations of said steeply dipping interface;

calculating a modified source-receiver offset using said subsurface acoustic velocity and each approximated location of the steeply dipping interface;

determining a two way travel time correction factor;

using said correction factor to convert the scale of said two way travel time for said horizontal interface to a two way travel time for each of said assumed locations of said steeply dipping interface by multiplying said two way travel time for said horizontal interface by the formula:

$$\frac{X - \text{OFF}}{X}$$

where

OFF = an actual offset from said various offsets,

X = a calculated new offset corresponding to said actual offset;

segregating said selected electrical signals representing seismic pulses having substantially similar correction factors;

summing said segregated selected electrical signals for predetermined points on said steeply dipping interface for each assumed location to obtain a maximum sum; and displaying a location of said steeply dipping subsurface interface represented by said maximum sum.

12. A method for determining the location of a steeply dipping interface comprising the steps of:

receiving seismic reflection data in the form of electrical signals;

separating said electrical signals into electrical signals representing data having moveout characteristics of double bounce raypath reflections from both a horizontal and a vertical interface and electrical signals having moveout characteristics of single bounce raypath reflections; and processing said separated electrical signals representing data having moveout characteristics of double bounce raypath reflections to determine the approximate location of the steeply dipping interface.

* * * * *